United States Patent [19]

Stine

[11] Patent Number: 5,421,216
[45] Date of Patent: Jun. 6, 1995

[54] COMPOUND TRANSMISSION HAVING HYBRID SINGLE AND TWIN COUNTERSHAFTS

[76] Inventor: Alan C. Stine, 5071 Foxcroft, Kalamazoo, Mich. 49002

[21] Appl. No.: 62,001

[22] Filed: May 14, 1993

[51] Int. Cl.$^6$ ............................................. F16H 3/08
[52] U.S. Cl. ...................................... 74/331; 74/745
[58] Field of Search ................... 74/329, 331, 333, 745

[56] References Cited

U.S. PATENT DOCUMENTS

| | | |
|---|---|---|
| 2,637,221 | 5/1953 | Backus . |
| 2,637,222 | 5/1953 | Backus . |
| 3,105,395 | 10/1963 | Perkins . |
| 3,283,613 | 11/1966 | Perkins . |
| 3,648,546 | 3/1972 | McNamara et al. . |
| 3,799,002 | 3/1974 | Richards . |
| 4,106,358 | 8/1978 | Morrison ............................. 74/331 |
| 4,152,949 | 5/1979 | Vandervoort et al. ............... 74/331 |
| 4,226,135 | 10/1980 | Winter ................................. 74/331 |
| 4,267,741 | 5/1981 | Jarl et al. . |
| 4,290,515 | 9/1981 | Bogema et al. . |
| 4,440,037 | 4/1984 | Foxton et al. . |
| 4,527,447 | 7/1985 | Richards . |
| 4,776,227 | 10/1988 | Janiszewski ........................ 74/331 |
| 5,231,895 | 8/1993 | Stine .................................. 74/745 |

Primary Examiner—Michael Koczo

[57] ABSTRACT

A "5×2" compound transmission is disclosed. A main section includes a mainshaft and two countershafts. The mainshaft has a spool gear rotatably mounted thereon and reverse and four forward gears rotationally fixed thereto. A first clutch splined on the first countershaft couples one of two countershaft gears rotatably engaged with a mainshaft gear to the first countershaft. A second clutch splined on the second countershaft couples one of two countershaft gears rotatably engaged with the other mainshaft gears to the second countershaft. An auxiliary section includes an output shaft and third and fourth countershafts. The third and fourth countershafts are concentric with the first and second countershafts, respectively, and are rotatably driven by the spool gear. The third and fourth countershafts have gears rotatably engaged with the fourth forward mainshaft gear and an output shaft splitter gear. A third clutch splined on the output shaft couples either a rearwardmost mainshaft gear or the splitter gear to the output shaft. A fourth clutch splined on the mainshaft couples the mainshaft to either the spool gear or the rearwardmost mainshaft gear. A 2×5 embodiment of the compound transmission is also disclosed.

17 Claims, 5 Drawing Sheets

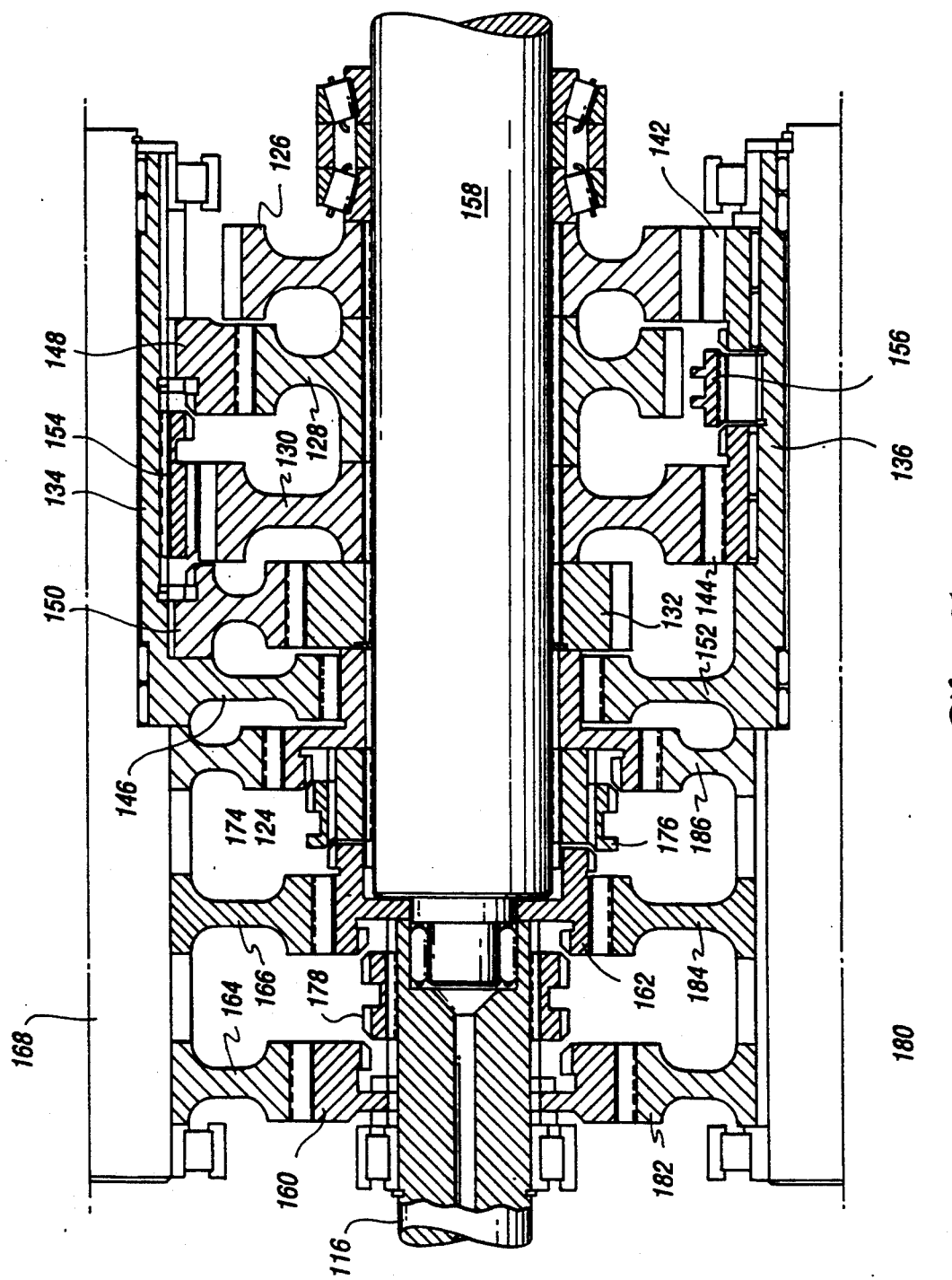

COMPOUND TRANSMISSION HAVING HYBRID SINGLE AND TWIN COUNTERSHAFTS

TECHNICAL FIELD

The present invention relates to compound transmissions including a multispeed main transmission section connected in series with a multispeed auxiliary transmission section, and in particular to such a compound transmission having clutches situated on two hybrid main section countershafts for selecting main section gears.

BACKGROUND ART

Compound change gear transmissions of the type having one or more auxiliary sections connected in series with a main transmission section are known in the prior art. Briefly, by utilizing main and auxiliary transmission sections connected in series, assuming proper sizing of the ratio steps, the total of available transmission ratios is equal to the product of the main and auxiliary section ratios. By way of example, a compound change gear transmission comprising a four (4) speed main section connected in series with a three (3) speed auxiliary section will theoretically provide twelve (4×3=12) available ratios.

Auxiliary transmission sections are of three general types: range type, splitter type or combined range/splitter type. In compound transmission having a range type auxiliary section, the ratio step or steps are greater than the total ratio coverage of the main transmission section and the main section is shifted progressively through its ratios in each range. Examples of compound transmissions having range type auxiliary sections may be seen by reference to U.S. Pat. Nos. 3,105,395; 2,637,222; and 2,637,221, the disclosures of which are hereby incorporated by reference.

In compound transmissions having a splitter type auxiliary section, the ratio steps of the splitter auxiliary section are less than the ratio steps of the main transmission section and each main section ratio is split, or subdivided, by the splitter section. Examples of compound change gear transmissions having splitter type auxiliary sections may be seen by reference to U.S. Pat. Nos. 4,290,515; 3,799,002; 4,440,037; and 4,527,447, the disclosures of which are hereby incorporated by reference.

In a combined range and splitter type auxiliary section, or sections, both range and splitter type ratios are provided allowing the main section to be progressively shifted through its ratios in at least two ranges and also allowing the main section ratios to be split in at least one range.

Examples of a compound transmission having a single combined range/splitter type auxiliary section may be seen by reference to U.S. Pat. Nos. 3,283,613 and 3,648,546, the disclosures of which are hereby incorporated by reference. Eaton also produces the "Super 10" compound transmission which has a 2+1 main section and an auxiliary section having both range and splitter gears. All three forward ratios are used in the low range, while two forward ratios are repeated in the high range. This results in a standard 5 speed shift pattern.

Another example of a combined range and splitter type compound transmission is the "Ecosplit" model of transmission sold by Zahnradfabrik Friedrichshafen Aktiengeselshaft of Friedrichshafen, Germany, which utilizes a separate splitter auxiliary section in front of, and a separate range auxiliary section behind, the main transmission section. Still another example is the RMO-13-145A thirteen speed transmission sold by Rockwell Corporation, in which the high range forward ratios are split.

It should be noted that the terms main and auxiliary section are relative and that if the designations of the main and auxiliary sections are reversed, the type of auxiliary section (either range or splitter) will also be reversed. In other words, given what is conventionally considered a four-speed main section with two-speed range type auxiliary section, if the normally designated auxiliary is considered the main section, the normally designated main section would be considered a four-speed splitter type auxiliary section therefor. By generally accepted transmission industry convention, and as used in this description of the invention, the main transmission section of a compound transmission is that section which contains the largest (or at least no less) number of forward speed ratios, which allows selection of a neutral position, which contains the reverse ratio(s) and/or which is shifted (in manual or semiautomatic transmissions) by manipulation of a shift bar or shift rail or shift shaft/shift finger assembly as opposed to master/slave valve/cylinder arrangements or the like.

SUMMARY OF THE INVENTION

The present invention is a compound transmission comprising a main transmission section connected in series with an auxiliary transmission section. In a preferred "5×2" embodiment, the main section includes a mainshaft and two countershafts. The mainshaft has a spool gear rotatably mounted thereon and reverse, first, second, third and fourth forward gears rotationally fixed thereto. The first countershaft has first and second countershaft gears rotatably mounted thereon and a third countershaft gear rotationally fixed thereto. The first, second and third countershaft gears rotatably engage the first forward gear, third forward gear, and spool gear, respectively. The second countershaft has fourth and fifth countershaft gears rotatably mounted thereon and a sixth countershaft gear rotationally fixed thereto. The fourth, fifth and sixth countershaft gears rotatably engage the second forward gear, fourth forward gear, and spool gear, respectively.

A first clutch is splined on the first countershaft and couples either the first countershaft gear or the second countershaft gear to the first countershaft. A second clutch is splined on the second countershaft and couples either the fourth countershaft gear or the fifth countershaft gear to the second countershaft.

The auxiliary section includes an output shaft and third and fourth countershafts. The output shaft has a splitter gear rotatably mounted thereon. The third countershaft is concentric with the first countershaft, and is rotatably driven by the spool gear. The third countershaft has seventh and eighth countershaft gears rotatable with the third countershaft and rotatably engaged with the fourth forward gear and the splitter gear, respectively. The fourth countershaft is concentric with the second countershaft, and is rotatably driven by the spool gear. The fourth countershaft has ninth and tenth countershaft gears rotatable with the fourth countershaft and rotatably engaged with the fourth forward gear and the splitter gear, respectively.

A third clutch is splined on the output shaft and couples either the fourth forward gear or the splitter gear to the output shaft. A fourth clutch is splined on the mainshaft and couples the mainshaft to either the spool gear or to the fourth forward gear.

Accordingly, it is an object of the present invention to provide a new and improved compound transmission having hybrid single and twin countershafts.

This and other objects and advantages of the present invention will become apparent from a reading of the detailed description of the preferred embodiment taken in connection with the drawings.

BRIEF DESCRIPTION OF THE DRAWINGS

FIG. 5 is a partial cross-sectional view of the compound transmission shown in FIG. 4.

DESCRIPTION OF THE PREFERRED EMBODIMENT

Figure 1:
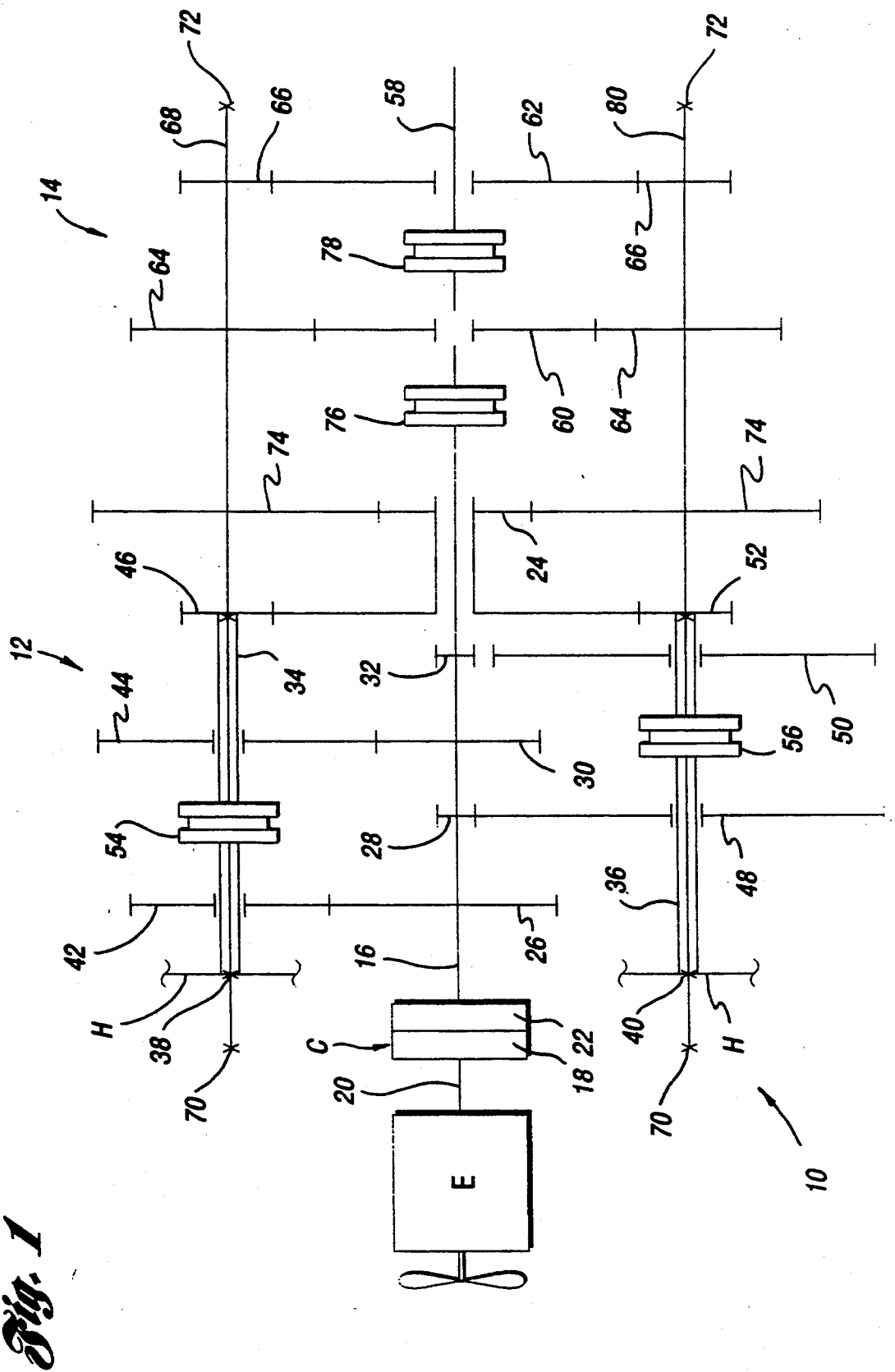
FIG. 1 is a schematic illustration of a compound transmission having an auxiliary section with two splitter gears.

Certain terminology will be used in the following description for convenience in reference only and will not be limiting. The words "upwardly", "downwardly", "rightwardly", and "leftwardly" will designate directions in the drawings to which reference is made. The words "forward" and "rearward" will refer respectively to the front and rear ends of the transmission as conventionally mounted in a vehicle, being respectfully from left and right sides of the transmission as illustrated in FIG. 1. The words "inwardly" and "outwardly" will refer to directions toward and away from, respectively, the geometric center of the device and designated parts thereof. Said terminology will include the words above specifically mentioned, derivatives thereof and words of similar import.

The term "compound transmission" is used to designate a change speed or change gear transmission having a multiple forward speed main transmission section and a multiple speed auxiliary transmission section connected in series whereby the selected gear reduction in the main transmission section may be compounded by further selected gear reduction in the auxiliary transmission section.

Figure 2:
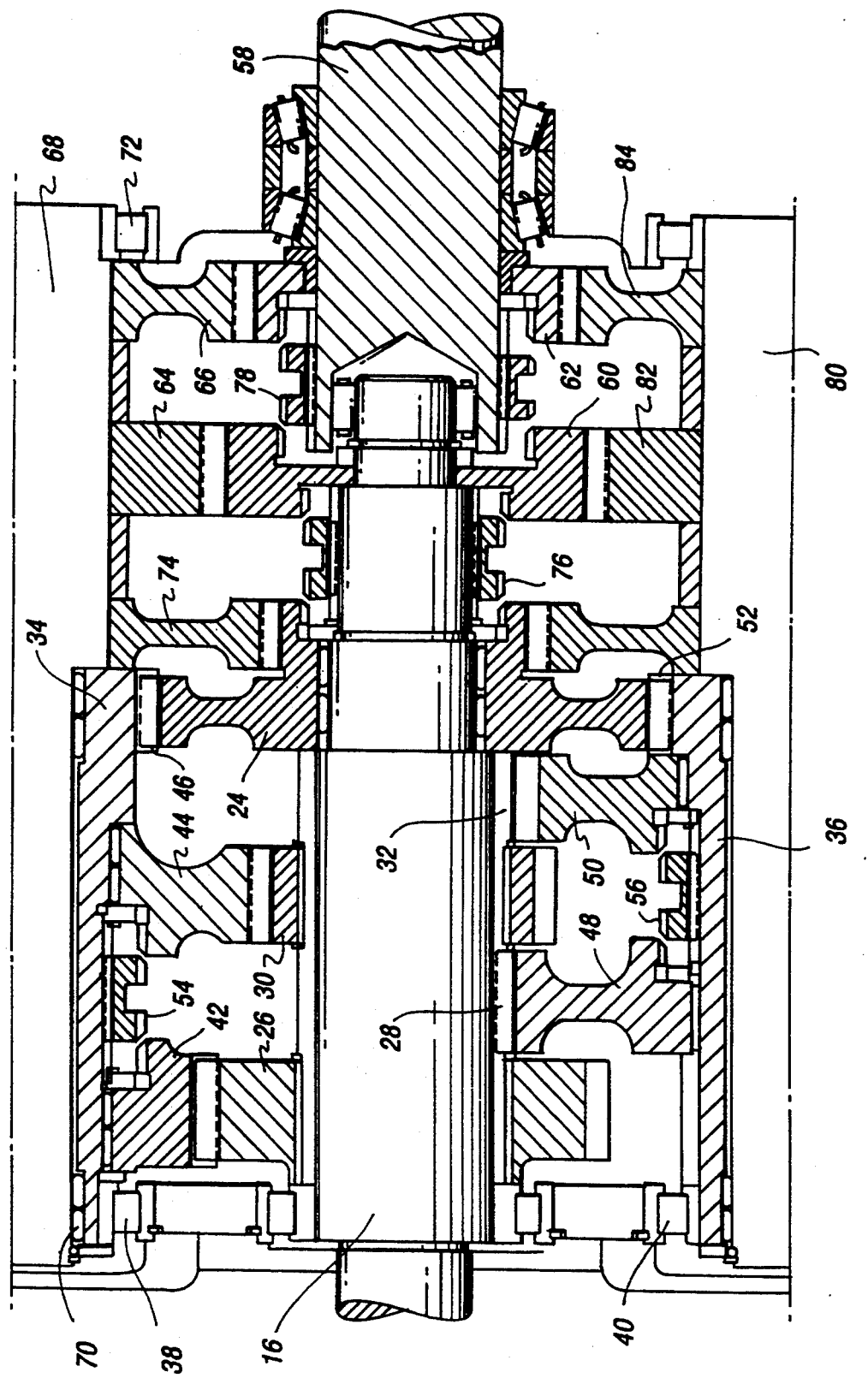
FIG. 2 is a partial cross-sectional view of the compound transmission shown in FIG. 1.

FIGS. 1 and 2 show a ten speed "5×2" compound transmission 10 according to the present invention. Compound transmission 10 comprises a multiple speed main transmission section 12 connected in series with an auxiliary transmission section 14. Typically, transmission 10 is housed within a single housing H and includes an input shaft 16 driven by a prime mover such as diesel engine E through a selectively disengaged, normally engaged friction master clutch C having an input or driving portion 18 drivingly connected to the engine crankshaft 20 and a driven portion 22 rotatably fixed to the transmission input shaft 16.

In main transmission section 12, the input or mainshaft 16 has a compound or spool gear 24 rotatably mounted thereon and a plurality of drive gears 26, 28, 30 and 32 rotationally fixed thereto. A drive gear 60 is rotatably mounted on the end of the mainshaft 16. The drive gear 28 may be formed as an involute spline on the mainshaft 16, as shown in FIG. 2, and may extend as an external spline along the mainshaft to drive the drive gears 26 and 30. Two substantially identical countershafts 34 and 36 are situated on opposite sides of the mainshaft 16, and are supported by bearings 38 and 40 in housing H, only a portion of which is schematically illustrated in FIG. 1. The main section countershaft 34 is provided with main section countershaft gears 42 and 44 rotatably mounted thereon, and a countershaft gear 46 fixed for rotation therewith. The main section countershaft 36 is provided with main section countershaft gears 48 and 50 rotatably mounted thereon, and a countershaft gear 52 substantially identical to countershaft gear 46 fixed for rotation therewith.

The mainshaft drive gear 32 is a reverse gear, and is rotatably engaged with the countershaft gear 50 mounted on the countershaft 36 through a conventional idler gear (not shown). The drive gear 28 provides a low or first forward speed ratio, and is rotatably engaged with the countershaft gear 48. The other two mainshaft drive gears 30 and 26 provide second and third forward speed ratios, and are respectively rotatably engaged with countershaft gears 44 and 42 mounted on the opposite countershaft 34. The countershaft gears 46 and 52 are rotatably engaged with the larger diameter portion of the spool gear 24.

Clutch collars 54 and 56 are respectively splined on the countershafts 34 and 36 for rotation therewith, and are axially positionable to either a fully leftward or fully rightward location, or in a centered, nonengaged position. The clutch collars 54 and 56 are axially positioned by means of shift yokes or forks (not illustrated) associated with a shift bar housing assembly (not illustrated), for example as described in U.S. Pat. No. 4,901,600, assigned to the assignee of the present invention and hereby incorporated by reference. Clutch collars 54 and 56 are, in the preferred embodiment, of the well known nonsynchronized double acting jaw clutch type. As is well known, only one of the clutches 54 or 56 is engageable at a given time and main section interlock means are provided to lock the other clutch in the neutral condition.

Auxiliary transmission section 14 is connected in series with main transmission section 12. An output shaft 58 generally coaxial with the mainshaft 16 carries a splitter gear 62 rotatably mounted thereon. The fourth forward gear 60 and the splitter gear 62 are respectively rotatably engaged with auxiliary section countershaft gear pairs 64 and 66, which in turn are rotationally fixed to auxiliary section countershafts 68 and 80. The auxiliary section countershafts 68 and 80 are supported by bearings 70 and 72 in housing H, and each auxiliary section countershaft also has an auxiliary section countershaft gear 74 fixed for rotation therewith. The gear 74 constantly meshes with the smaller diameter portion of the spool gear 24 so that the auxiliary countershafts 68 and 80 are rotatably drivable by the spool gear 24.

Main transmission section 12 provides a reverse speed ratio and five selectable forward speed ratios. The reverse speed ratio is provided by positioning the clutch 56 to its fully rightward position to drivingly connect the countershaft gear 50 to the countershaft 36. The power path thus provided is from the mainshaft 16 through the reverse gear 32, the idler gear, and the countershaft gear 50 to the countershaft 36, and then through the countershaft gear 52 to the spool gear 24. The first and lowest forward speed ratio is provided by moving the clutch 56 to its fully leftward position to drivingly connect the countershaft gear 48 to the countershaft 36. The power path thus provided is from the mainshaft 16 through the drive gear 28 and the countershaft gear 48 to the countershaft 36, and then through the countershaft gear 52 to the spool gear 24.

The second and third forward ratios, having reduction ratios increasingly less than that provided by the drive gear 28, are obtained by alternating the clutch 54 between it rightwardmost and leftwardmost positions to drivingly couple gears 44 or 42 to the countershaft 34. The power path provided by the former couple is from the mainshaft 16 through the drive gear 30 and the countershaft gear 44 to the countershaft 34, and then through the countershaft gear 46 to the spool gear 24. The power path provided by the latter couple is from the mainshaft 16 through the drive gear 26 and the countershaft gear 42 to the countershaft 34, and then through the countershaft gear 46 to the spool gear 24.

A sliding three position jaw clutch collar 76 is splined on the end of the mainshaft 16 for rotation therewith. Clutch assembly 76 may be selectively located in the leftwardmost axial position to drivingly couple the spool gear 24 to the mainshaft 16 to provide a fourth forward speed ratio. Clutch assembly 76 may also be located in a centered nonengaged position, or in the rightwardmost axial position to drivingly couple the mainshaft to the drive gear 60 to provide a fifth forward speed ratio. Typically, clutch assembly 76 is shifted by a fork (not shown) controlled by the vehicle operator.

A sliding two position jaw clutch collar 78 is similarly splined to and rotatable with the ouput shaft 58. Splitter clutch collar 78 may be selectively located in the leftwardmost axial position to drivingly couple the drive gear 60 to the output shaft 58, or may be selectively located in the rightwardmost axial position to rotationally couple the back splitter gear 62 to the output shaft. Typically, clutch assembly 78 is axially positioned by means of a shift fork (not shown) controlled by a remotely controlled fluid actuated piston assembly. The piston assembly is operable by a driver selection switch such as a button or the like on the shift knob, for example as described in U.S. Pat. No. 5,000,060, assigned to the assignee of the present invention and hereby incorporated by reference. The structure and function of the sliding jaw clutches 76 and 78 are substantially identical to the structure and function of jaw clutch collars 54 and 56 utilized in the main transmission section 12.

Each of the five forward speed ratios, as well as the reverse speed ratio, are split in the auxiliary section 14 by moving the splitter clutch 78. For the low splitter ratio operation, the clutch 78 is moved to its fully leftward position to couple the drive gear 60 to the output shaft 58. The power path thus provided is from the spool gear 24 through the auxiliary countershaft drive gear 74 to the auxiliary countershaft 68, and then through the auxiliary countershaft gear 64 and the drive gear 60 to the output shaft 58. To split any of the ratios provided by the main section 12, the splitter clutch 78 is shifted to its rightwardmost axial position to couple the back splitter gear 62 to the output shaft 58. The power path thus provided is from the spool gear 24 through the auxiliary countershaft drive gear 74 to the auxiliary countershaft 68, and then through the auxiliary countershaft gear 66 and the back splitter gear 62 to the output shaft 58.

The ninth forward speed ratio is a direct drive, and is provided by moving the mainshaft clutch 76 to its fully rightward position to couple the mainshaft 16 to the drive gear 60, and simultaneously positioning the splitter clutch 78 to couple the drive gear 60 to the output shaft 58. The tenth forward speed ratio is an overdrive ratio, and is provided by maintaining the mainshaft clutch 76 in the fully rightward position to couple the mainshaft 16 to the drive gear 60, and moving the splitter clutch 78 to couple the back splitter gear 62 to the output shaft 58.

FIG. 2 shows a preferred embodiment of the compound transmission 10 shown in FIG. 1. In the preferred embodiment, a fourth countershaft 80 is provided having countershaft gears 82 and 84 fixed for rotation therewith. The auxiliary countershaft gears 82 and 84, along with the auxiliary countershaft gears 64 and 66, respectively support the drive gear 60 and the back splitter gear 62. The auxiliary countershaft 80 extends through the main section 12, where the main section countershaft 36 is in the form of a tube located concentrically around and rotatable with respect to the auxiliary section countershaft 80. The main section countershaft 34 is similarly in the form of a tube located concentrically around and rotatable with respect to an extension of the auxiliary section countershaft 68. The clutches 54 and 56 are therefore respectively splined to the tubes 34 and 36.

Figure 3:
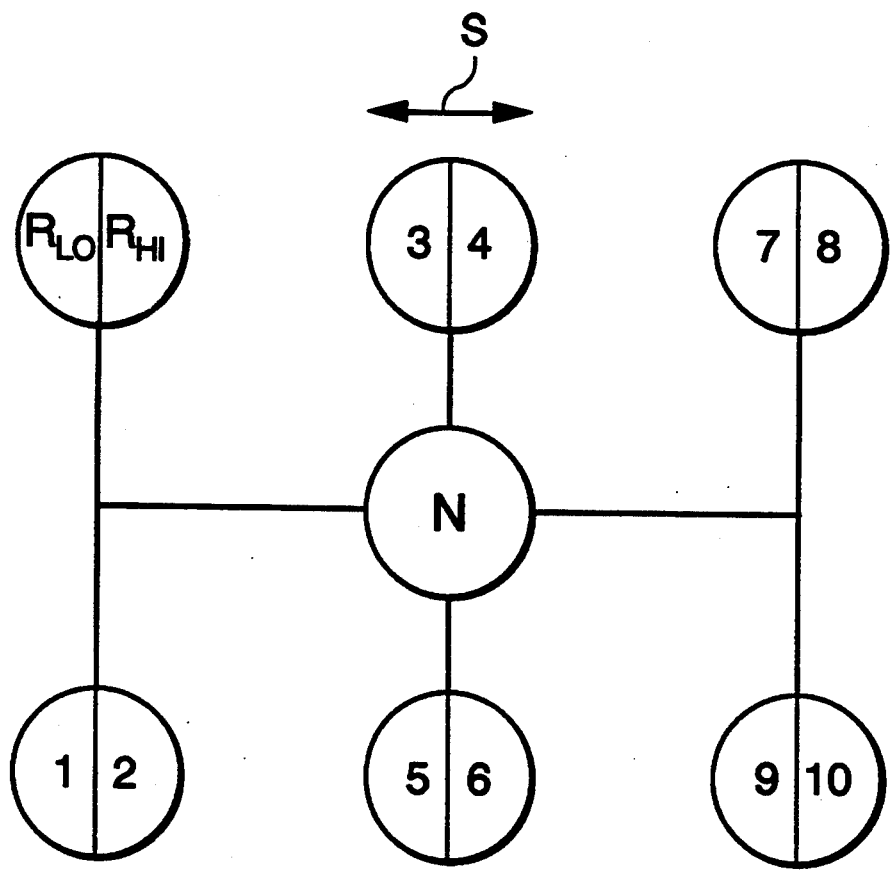
FIG. 3 is a schematic illustration of a shift pattern for the compound transmission.

FIG. 3 shows the shift pattern for the ten speed compound transmission 10. Divisions in the horizontal direction represented by arrow S represent splitter shifts. All of the six shift pattern positions provide two selectable ratios, including the reverse gear position. In the leftwardmore shift pattern positions, the splitter clutch 78 couples the drive gear 60 to the output shaft 58. In the rightwardmore shift pattern positions, the clutch 78 couples the back splitter gear 62 to the output shaft 58. Because the reverse ratio and the five forward ratios can all be split in the auxiliary section, the shift pattern for the compound transmission 10 has a standard 5 speed, non-repeat shift pattern.

Figure 4:
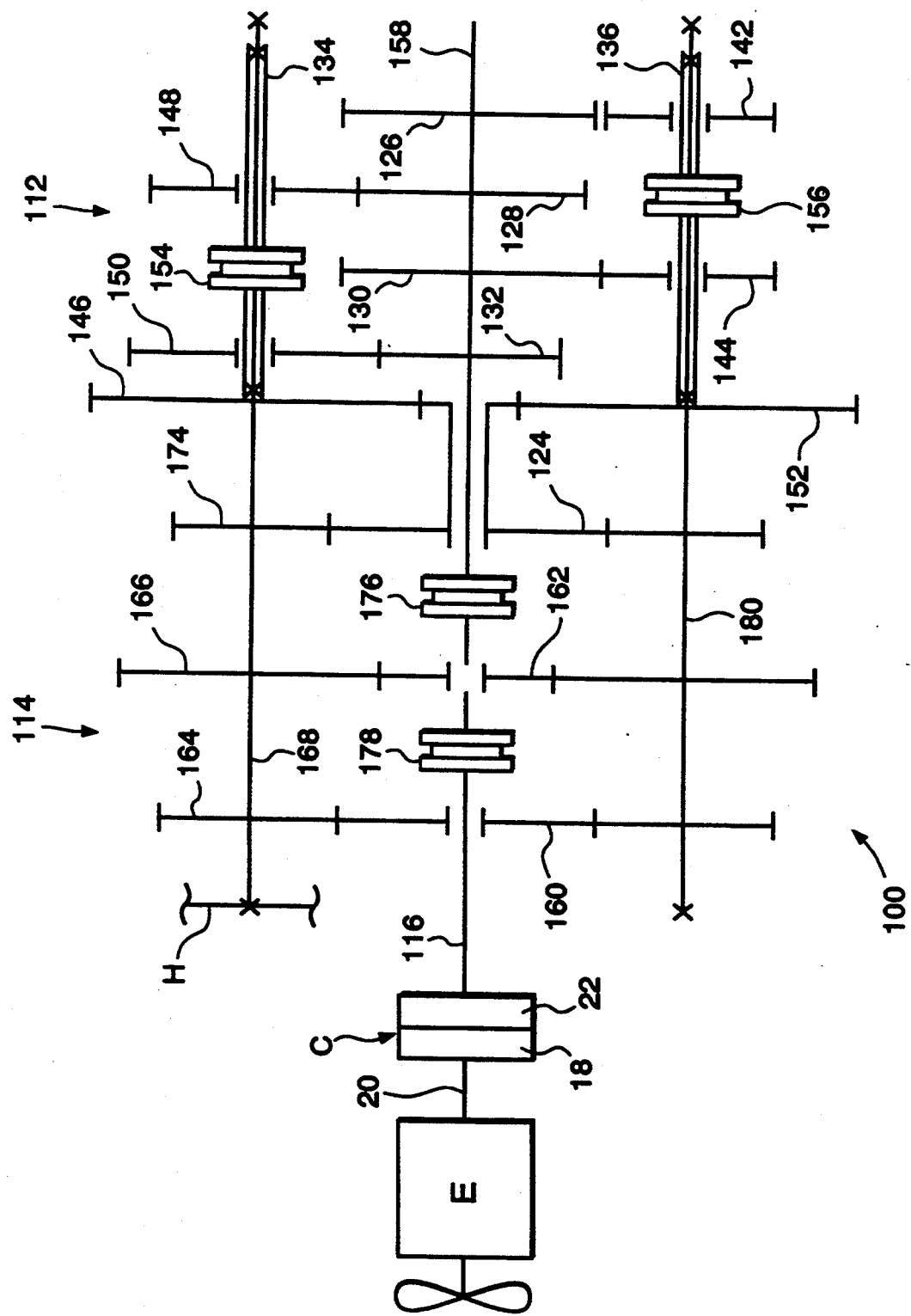
FIG. 4 is a schematic illustration an alternative embodiment of the compound transmission.

FIGS. 4 and 5 show an alternative "2×5" embodiment 100 of the present invention with the main section 112 behind the auxiliary section 114. In this embodiment, the input shaft 116 carries a splitter gear 160 rotatably mounted thereon, and a splitter clutch 178 splined for rotation therewith. As shown in FIG. 5, a forward drive gear 162 is rotatably mounted on the front end of output shaft 158. The auxiliary section countershafts 168 and 180 have respective countershaft gears 164, 166, 174 and 182, 184, 186 rotatably fixed thereto. The countershaft gears 164 and 182 constantly mesh with the front splitter gear 160, while the countershaft gears 166 and 184 constantly mesh with the drive gear 162.

The countershaft gears 174 and 186 drive the larger diameter portion of the spool gear 124, which is rotatably mounted on the output shaft 158. Clutch 176 and drive gears 126, 128, 130 and 132 are rotationally fixed to the output shaft 158. The drive gears 132 and 128 respectively rotatably engage countershaft gears 150 and 148 rotatably mounted on auxiliary countershaft 134, which also has countershaft gear 146 and clutch 154 rotatable therewith. The output shaft drive gears 130 and 126 respectively rotatably engage countershaft gears 144 and 142 rotatably mounted on auxiliary countershaft 136, the latter through an idler gear (not shown). Clutch 156 and countershaft drive gear 152 are rotationally fixed to the countershaft 136.

As shown in FIG. 5, the main section countershafts 134 and 136 are preferably located concentrically around the extensions of main section countershafts 168 and 180, respectively. The compound transmission 100 operates substantially the same as the compound transmission 10 shown in FIGS. 1 and 2 and described above, and uses the same 5 speed shift pattern shown in FIG. 3.

The present invention provides a hybrid single/dual countershaft design which is highly efficient in terms of the number of gears required and the overall transmission length. In addition to being more compact because the main section clutches are mounted on opposite countershafts instead of on the mainshaft as is more conventional, the present invention also results in a transmission which weighs less than conventional transmissions.

Although the present invention has been set forth with a certain degree of particularity, it is understood that various modifications are possible without departing from the spirit and the scope of the invention as hereinafter claimed.

What is claimed is:

1. A compound transmission comprising:
    a main section including:
        a mainshaft (16) having a spool gear (24) fifth (60) drive gear rotatably mounted thereon and first (26), second (28), third (30), and fourth (32) drive gears rotationally fixed thereto,
        a first countershaft (34) having first (42) and second (44) countershaft gears rotatably mounted thereon and a third countershaft gear (46) rotationally fixed thereto, the first, second and third countershaft gears being rotatably engaged with the first drive gear, third drive gear, and spool gear, respectively,
        a second countershaft (36) having fourth (48) and fifth (50) countershaft gears rotatably mounted thereon and a sixth countershaft gear (52) rotationally fixed thereto, the fourth, fifth and sixth countershaft gears being rotatably engaged with the second drive gear, fourth drive gear, and spool gear, respectively,
        a first clutch (54) rotatable with the first countershaft and having a first position for coupling the first countershaft gear to the first countershaft and a second position for coupling the second countershaft gear to the first countershaft,
        a second clutch (56) rotatable with the second countershaft and having a first position for coupling the fourth countershaft gear to the second countershaft and a second position for coupling the fifth countershaft gear to the second countershaft, and
        a third clutch (76) rotatable with the mainshaft and having a first position for coupling the spool gear to the mainshaft, a second nonengaged position, and a third position for coupling the mainshaft to the fifth drive shaft gear; and
    an auxiliary section including:
        an output shaft (58) having a gear (62) rotatably mounted thereon,
        a third countershaft (68) rotatably driven by the spool gear and having seventh (64) and eighth (66) countershaft gears rotationally fixed to the third countershaft, the seventh and eighth countershaft gears being rotatably engaged with the fifth drive gear and the output shaft gear, respectively, and
        a fourth clutch (78) rotatable with the output shaft and having a first position for coupling the fifth drive gear to the output shaft and a second position for coupling the output shaft gear to the output shaft.

2. The compound transmission of claim 1 wherein the first countershaft (34) is located concentrically around the third countershaft (68).

3. The compound transmission of claim 1 further comprising a fourth countershaft (80) rotatably driven by the spool gear and having ninth (82) and tenth (84) countershaft gears rotatable with the fourth countershaft and rotatably engaged with the fifth drive gear and the output shaft gear, respectively.

4. The compound transmission of claim 3 wherein the second countershaft (36) is located concentrically around the fourth countershaft (80).

5. The compound transmission of claim 1 wherein the second drive gear is mounted on the mainshaft between the first and third drive gears.

6. The compound transmission of claim 1 wherein the first, second, third and fourth clutches are splined on their respective shafts.

7. The compound transmission of claim 1 wherein the mainshaft is generally coaxial with the output shaft.

8. The compound transmission of claim 1 wherein the fourth drive gear (32) is a reverse gear, and is rotatably engaged with the fifth countershaft gear (50).

9. A compound transmission comprising:
    a first section including:
        an input shaft (116) having a gear (160) rotatably mounted thereon, and
        a first clutch (178) rotatable with the input shaft; and
    a second section including:
        an output shaft (158) having a spool gear (124) and a first (162) drive gear rotatably mounted thereon and second (132), third (130), fourth (128) and fifth (126) drive gears rotationally fixed thereto,
        a first countershaft (168) having first (164), second (166) and third (174) countershaft gears rotatable with the first countershaft, the first and second countershaft gears being rotatably engaged with the input shaft gear (160) and the first drive gear (162), respectively, and the third countershaft gear being drivingly engaged with the spool gear (124),
        the first clutch having a first position for coupling the input shaft gear to the input shaft and a second position for coupling the first drive gear to the input shaft,
        a second countershaft (134) rotatably driven by the spool gear and having fourth (150) and fifth (148) countershaft gears rotatably mounted thereon, the fourth and fifth countershaft gears being rotatably engaged with the second (132) and fourth drive gear (128), respectively,
        a third countershaft (136) rotatably driven by the spool gear and having sixth (144) and seventh (142) countershaft gears rotatably mounted thereon, the sixth and seventh countershaft gears being rotatably engaged with the third (130) and fifth (126) drive gear, respectively,
        a second clutch (154) rotatable with the second countershaft (134) and having a first position for coupling the fourth countershaft gear to the second countershaft and a second position for coupling the fifth countershaft gear to the second countershaft, a third clutch (156) rotatable with the third countershaft and having a first position for coupling the sixth countershaft gear to the third countershaft and a second position for coupling the seventh countershaft gear to the third countershaft, and a fourth clutch (176) rotatable with the output shaft and having a first position for coupling the spool gear to the output shaft, a second nonengaged position, and a third position for coupling the first drive gear (162) to the output shaft.

10. The compound transmission of claim 9 wherein the second countershaft (134) is located concentrically around the first countershaft (168).

11. The compound transmission of claim 9 further comprising a fourth countershaft (180) having eighth (182), ninth (184) and tenth (186) countershaft gears rotatable with the fourth countershaft, the eighth, ninth and tenth countershaft gears being rotatably engaged with the input shaft gear (160), first drive gear (162), and spool gear (124), respectively.

12. The compound transmission of claim 11 wherein the third countershaft (136) is located concentrically around the fourth countershaft (180).

13. The compound transmission of claim 9 wherein the second drive gear is mounted on the output shaft between the first and third drive gears.

14. The compound transmission of claim 9 wherein the first, second, third and fourth clutches are splined on their respective shafts.

15. The compound transmission of claim 9 wherein the input shaft is generally coaxial with the output shaft.

16. The compound transmission of claim 9 wherein the fifth drive gear (126) is a reverse gear, and is rotatably engaged with the seventh countershaft gear.

17. A compound transmission comprising:
a main section including:
a mainshaft (16) having a spool gear (24) and a fourth (60) forward gear rotatably mounted thereon and reverse (32), first (26), second (28), and third (30) forward gears rotationally fixed thereto,
a first countershaft (34) having first (42) and second (44) countershaft gears rotatably mounted thereon and a third countershaft gear (46) rotationally fixed thereto, the first, second and third countershaft gears being rotatably engaged with the first forward gear, third forward gear, and spool gear, respectively,
a second countershaft (36) having fourth (48) and fifth (50) countershaft gears rotatably mounted thereon and a sixth countershaft gear (52) rotationally fixed thereto, the fourth, fifth and sixth countershaft gears being rotatably engaged with the second forward gear, reverse gear, and spool gear, respectively,
a first clutch (54) splined on the first countershaft for rotation therewith and having a first position for coupling the first countershaft gear to the first countershaft and a second position for coupling the second countershaft gear to the first countershaft, and
a second clutch (56) splined on the second countershaft for rotation therewith and having a first position for coupling the fourth countershaft gear to the second countershaft and a second position for coupling the fifth countershaft gear to the second countershaft;
an auxiliary section including:
an output shaft (58) generally coaxial with the input shaft and having a gear (62) rotatably mounted thereon,
a third countershaft (68) concentric with the first countershaft and rotatably driven by the spool gear, the third countershaft having seventh (64) and eighth (66) countershaft gears rotatable with the third countershaft and rotatably engaged with the fourth forward gear (60) and the output shaft gear (62), respectively,
a fourth countershaft (80) concentric with the second countershaft and rotatably driven by the spool gear, the fourth countershaft having ninth (82) and tenth (84) countershaft gears rotatable with the fourth countershaft and rotatably engaged with the fourth forward gear (60) and the output shaft gear (62), respectively, and
a third clutch (78) splined on the output shaft for rotation therewith and having a first position for coupling the fourth forward gear to the output shaft and a second position for coupling the output shaft gear to the output shaft; and
a fourth clutch (76) splined on the mainshaft for rotation therewith and having a first position for coupling the spool gear to the mainshaft, a second nonengaged position, and a third position for coupling the mainshaft to the fourth forward gear.

* * * * *

UNITED STATES PATENT AND TRADEMARK OFFICE
CERTIFICATE OF CORRECTION

PATENT NO. : 5,421,216
DATED : June 6, 1995
INVENTOR(S) : Alan C. Stine

It is certified that error appears in the above-identified patent and that said Letters Patent is hereby corrected as shown below:

On the title page, item [73]: Insert the following:

Assignee: Eaton Corporation
                Cleveland, Ohio

Column 2, before item [57]: Insert  Attorney, Agent, or Firm--

Brooks & Kushman P.C.--.

Signed and Sealed this

Twelfth Day of September, 1995

Attest:

BRUCE LEHMAN

Attesting Officer      Commissioner of Patents and Trademarks